(12) United States Patent  (10) Patent No.: US 8,248,376 B2
Brown et al.  (45) Date of Patent: Aug. 21, 2012

(54) USER INTERFACES AND ASSOCIATED APPARATUS AND METHODS

(75) Inventors: Murray Brown, Aldershot (GB); Simon Cox, Aldershot (GB); Graham Clay, Basingstoke (GB)

(73) Assignee: Nokia Corporation, Espoo (FI)

( * ) Notice: Subject to any disclaimer, the term of this patent is extended or adjusted under 35 U.S.C. 154(b) by 795 days.

(21) Appl. No.: 12/274,299

(22) Filed: Nov. 19, 2008

(65) Prior Publication Data

US 2010/0123677 A1    May 20, 2010

(51) Int. Cl.
*G06F 3/041* (2006.01)
(52) U.S. Cl. .................. 345/173; 345/174; 345/178
(58) Field of Classification Search .............. 345/173, 345/174, 178, 161
See application file for complete search history.

(56) References Cited

U.S. PATENT DOCUMENTS

| | | | |
|---|---|---|---|
| 4,190,804 A | 2/1980 | Pyne et al. | |
| 7,102,541 B2 * | 9/2006 | Rosenberg | 341/20 |
| 2003/0214485 A1 * | 11/2003 | Roberts | 345/173 |
| 2006/0119578 A1 * | 6/2006 | Kesavadas et al. | 345/161 |
| 2006/0227114 A1 * | 10/2006 | Geaghan et al. | 345/173 |
| 2007/0052690 A1 * | 3/2007 | Roberts | 345/173 |
| 2007/0103449 A1 * | 5/2007 | Laitinen et al. | 345/173 |
| 2007/0216657 A1 | 9/2007 | Konicek | |
| 2009/0066674 A1 * | 3/2009 | Maharyta et al. | 345/178 |

OTHER PUBLICATIONS

J. David Smith et al., "Low-cost malleable surfaces with multi-touch pressure sensitivity", IEEE, 2007, pp. 205-208.*

* cited by examiner

*Primary Examiner* — Thuy Pardo
(74) *Attorney, Agent, or Firm* — Harrington & Smith

(57) ABSTRACT

Apparatus comprising one or more inputs configured to receive a configurable control signal from a configurable signal generator; and a non-calibrated touch input signal from a touch sensor. Said non-calibrated touch input signal generated by detecting both internal and external forces applied to the touch sensor. The apparatus also comprises a calibrator configured to process the non-calibrated touch input signal and the configurable control signal to remove the contribution of the internal forces from the non-calibrated signal to generate a calibrated signal, the calibrated signal for use in the detection of an external force applied to the touch sensor.

24 Claims, 11 Drawing Sheets

USER INTERFACES AND ASSOCIATED APPARATUS AND METHODS

TECHNICAL FIELD

The present disclosure relates to the field of apparatus for generating a calibrated signal representative of an external force applied to a touch/force sensor, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

With the current trend in the use of capacitive touch screen user interfaces in mobile telephones, the tactile feedback that comes with changes in finger pressure as on a conventional key-dome key pad has to a great extent been lost. To overcome this, a method of detecting the force applied to the screen in conjunction with the finger position is required. One solution is to use a semiconductor piezoresistive type force sensor such as the Hokuriku HFD-500. This is a resistive bridge which changes value linearly in proportion to the force that is applied to the silicon substrate. The sensor is mounted on the telephone's printed wiring board (PWB) and the force is transferred to the silicon from the screen mechanically.

The voltage differential from the force sensor is the product of not only the finger pressure (an external force), which represents only a small component of the total force, but also a much greater and unknown compression force (an internal force) which is a result of the glass pressing down on the sensor when the phone is assembled. Also, the device has a broadly specified offset voltage which may vary anywhere within the offset limits. All of these factors are subject to variation over time due to, for example, changes in temperature and environment and may also drift with aging.

The standard solution is to amplify the signal using a simple linear amplifier and remove the d.c. offset in software by filtering. The problem with this method is that because the desired signal representative of an external force is so small in proportion to the offset caused, at least in part, by an internal force, the amplifier gain would be defined by the point at which the maximum total signal would start to be limited. However, as the maximum total signal is unknown, the gain would have to be sufficiently small to give a comfortable margin. With such a small gain, the required signal representative of an external force may not be large enough to be resolved accurately.

SUMMARY

According to a first aspect of the invention, there is provided an apparatus comprising:
  one or more inputs configured to receive:
    a configurable control signal from a configurable signal generator; and
    a non-calibrated touch input signal from a touch sensor, said non-calibrated touch input signal generated by detecting both internal and external forces applied to the touch sensor; and
  a calibrator configured to process the non-calibrated touch input signal and the configurable control signal to remove the contribution of the internal forces from the non-calibrated signal to generate a calibrated signal, the calibrated signal for use in the detection of an external force applied to the touch sensor.

Using a configurable control signal to remove the contribution of the internal forces from the non-calibrated signal can enable the contribution of external forces to the non-calibrated signal to be determined from the calibrated signal. In some embodiments, filtering may not be required to distinguish signals representative of external forces from signals representative of internal forces.

The apparatus may further comprise a configurable signal generator configured to provide the configurable control signal. The signal generator may be located on the same device as the force sensor, or may be located on a different device to the force sensor. The configurable control signal may be an oscillating signal, and the characteristics of the configurable control signal may be set such that the calibrated signal meets a threshold condition when no external force is applied to the touch sensor. The threshold condition may be that the amplitude of the calibrated signal remains within a specified voltage range.

The characteristics of the configurable control signal that can be configured/controlled can comprise one or more of: mark-space ratio, frequency and amplitude. Varying the characteristics can adjust the amount of the bias that is applied to the calibrator in order to remove the contribution of the internal forces from the non-calibrated signal. In some embodiments, the amount of bias that is applied to the calibrator can vary linearly with regard to adjustments of the characteristics of the configurable control signal. In other embodiments, configuring one or more of the characteristics of the configurable control signal can cause a non-linear effect on the amount of bias applied.

The configurable control signal may be a triangular waveform that has been generated by integrating a pulse width modulated signal over time. The calibrated signal may be integrated over time to generate an integrated output signal. This can enable a direct current (d.c.) measure of the external force to be determined.

The calibrator may comprise an operational amplifier, which may be operated in open-loop or with negative feedback. The negative input of the operational amplifier may be controlled by negative feedback from the output of the operational amplifier. The calibrator may comprise a comparator.

The characteristics of the configurable control signal may be set at times when it is assumed that no external force is being applied to the touch sensor such that the calibrated signal satisfies a threshold condition when no external force is applied, and wherein the characteristics, such as the amplitude, of the calibrated signal is representative of an external force applied to the touch sensor The characteristics of the configurable control signal may be set each time a device comprising the apparatus is switched on.

The characteristics of the configurable control signal may be set periodically such that the calibrated signal tends towards a threshold condition, and wherein the characteristics of the configurable control signal are representative of an external force applied to the touch sensor.

The characteristics of the configurable control signal may be set regularly enough in order that any external forces applied to the touch sensor are not missed. For example, every 10 ms, that is at a frequency of 100 Hz.

There may be provided a capacitive touch screen and/or an electronic device comprising the apparatus of the first aspect of the invention. The electronic device may be a portable electronic device such as a mobile telephone or a personal digital assistant (PDA).

There may be provided a module for a device, the module comprising an apparatus comprising:
  one or more inputs configured to receive:
    a configurable control signal from a configurable signal generator; and
    a non-calibrated touch input signal from a touch sensor, said non-calibrated touch input signal generated by detecting both internal and external forces applied to the touch sensor; and
  a calibrator configured to process the non-calibrated touch input signal and the configurable control signal to remove the contribution of the internal forces from the non-calibrated signal to generate a calibrated signal, the calibrated signal for use in the detection of an external force applied to the touch sensor.

According to a second aspect of the invention, there is provided a method of generating a calibrated signal for use in the detection of an external force applied to a touch sensor, comprising:
  receiving a non-calibrated touch input signal representative of both internal and external forces applied to the touch sensor;
  receiving a configurable control signal from a configurable signal generator; and
  processing the non-calibrated touch input signal and the configurable control signal to remove the contribution of the internal forces from the non-calibrated signal to generate a calibrated signal, the calibrated signal for use in the detection of an external force applied to the touch sensor.

The method may further comprise adjusting one or more characteristics of the configurable control signal until the calibrated signal satisfies a threshold condition. Such a method may be considered as a method of calibrating an apparatus.

The method may be performed if the calibrated signal falls below a pre-determined threshold condition. This may provide an indication that the characteristics of the configurable control signal were set when an external force was being applied to the touch sensor. This may mean that bias provided by the configurable control signal also represents at least a part of a contribution by an external force.

According to a further aspect of the invention, there is provided a computer program, which may be recorded on a carrier, the computer program comprising computer code, which when run on a computer is configured to perform the method of:
  receiving a non-calibrated touch input signal representative of both internal and external forces applied to a touch sensor;
  receiving a configurable control signal from a configurable signal generator; and
  processing the non-calibrated touch input signal and the configurable control signal to remove the contribution of the internal forces from the non-calibrated signal to generate a calibrated signal, the calibrated signal for use in the detection of an external force applied to the touch sensor.

According to a further aspect of the invention, there is provided a computer-readable storage medium having stored thereon a data structure comprising a computer program, which when run on a computer is configured to perform the method of:
  receiving a non-calibrated touch input signal representative of both internal and external forces applied to a touch sensor;
  receiving a configurable control signal from a configurable signal generator; and
  processing the non-calibrated touch input signal and the configurable control signal to remove the contribution of the internal forces from the non-calibrated signal to generate a calibrated signal, the calibrated signal for use in the detection of an external force applied to the touch sensor.

According to a further aspect of the invention, there is provided a signal comprising a computer program, which comprises computer code which when run on a computer is configured to perform the method of:
  receiving a non-calibrated touch input signal representative of both internal and external forces applied to a touch sensor;
  receiving a configurable control signal from a configurable signal generator; and
  processing the non-calibrated touch input signal and the configurable control signal to remove the contribution of the internal forces from the non-calibrated signal to generate a calibrated signal, the calibrated signal for use in the detection of an external force applied to the touch sensor.

The signal may be an internet, or any other network, download.

There may be provided apparatus for generating an output signal for use in the detection of an external force applied to the apparatus, the apparatus comprising:
  a force sensor configured to generate a force sensor output signal representative of a total force applied to the sensor;
  a configurable signal generator configured to generate an oscillating bias control signal; and
  a comparator configured to compare the force sensor output signal and the bias control signal and generate an output signal for use in the determination of the external force applied.

There may be provided apparatus comprising:
  one or more inputs configured to receive:
    a configurable control signal from a configurable signal generator; and
    a non-calibrated signal, said non-calibrated signal; and
  a calibrator configured to process the non-calibrated signal and the configurable control signal to remove a first, in some embodiments undesired, contribution from the non-calibrated signal to generate a calibrated signal.

It will be appreciated that in some embodiments, any of the features of an apparatus and/or method described herein may be used with different types of electronic circuits, and not necessarily just with touch sensors. For example, embodiments described herein may be used with any electronic sensor to distinguish between a desired signal and a background/offset signal, which may be the first, in some embodiments undesired, contribution. In other embodiments, there may be provided apparatus and/or methods for electronic signal recovery, that can include apparatus and/or methods for recovering a dynamic signal in the presence of a large and relatively static offset signal, which again may be the first, in some embodiments undesired, contribution.

Any of the features herein described in relation to touch sensors can also be used in the more general context of any electronic signal recovery.

The present disclosure includes one or more corresponding aspects, embodiments or features in isolation or in various combinations whether or not specifically stated (including claimed) in that combination or in isolation. Corresponding means for performing one or more of the discussed functions are also within the scope of the present disclosure.

The above summary is intended to be merely exemplary and non-limiting.

BRIEF DESCRIPTION OF THE FIGURES

A description is now given, by way of example only, with reference to the accompanying drawings, in which.

DESCRIPTION OF SPECIFIC ASPECTS/EMBODIMENTS

One or more embodiments described herein provide a circuit wherein a direct current (d.c). or slowly varying component of a touch/force sensor output signal representing internal forces can be rejected by modulating a bias control signal, leaving only the variable signal representing external forces, which can then be amplified to the desired level. In this way the effect of long term drift, component and unit to unit variation when determining an external force that has been applied to the touch/force sensor can be reduced and/or eliminated.

Modulating the bias control signal may be considered as tuning the circuit to account for signals representative of internal forces and/or providing an offset that cancels out signals representative of internal forces.

Figure 1:
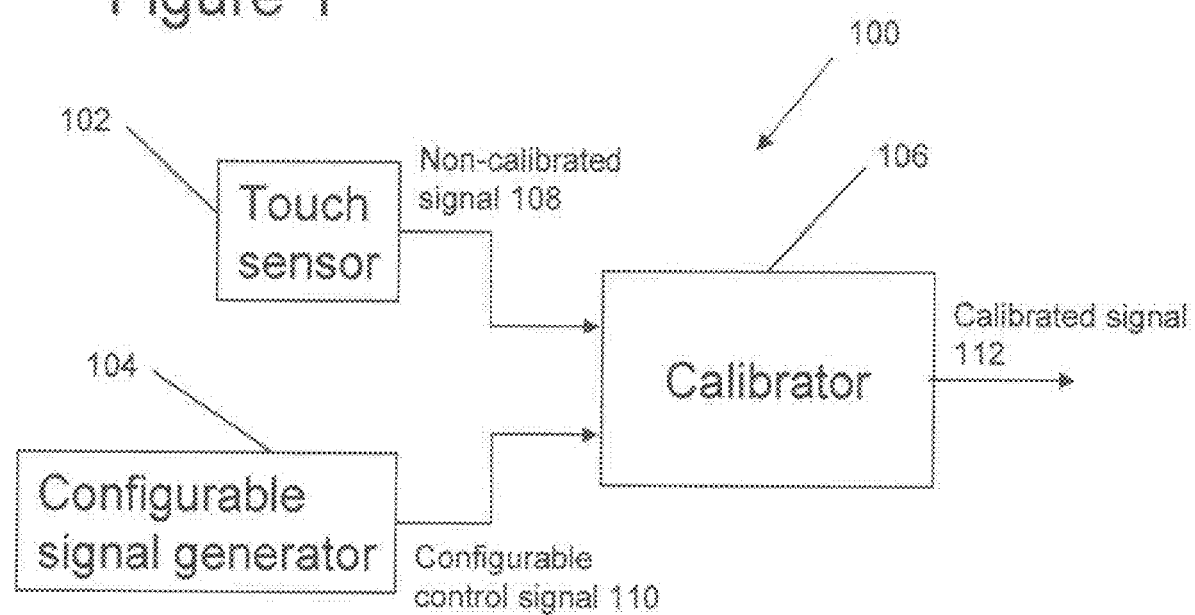
FIG. 1 illustrates an apparatus according to an embodiment of the invention.

FIG. 1 illustrates apparatus 100 for generating a calibrated signal 112 according to an embodiment of the invention. The calibrated signal 112 can be used for the detection of an external force that has been applied to a touch sensor 102 associated with the apparatus.

The apparatus 100 comprises a touch sensor 102, a configurable signal generator 104, and a calibrator 106.

The touch sensor 102, which may also be known as a force sensor, is configured to generate a non-calibrated touch input signal 108 by detecting both internal and external forces applied to the touch sensor 102.

The internal forces may be considered as background or offset forces which are applied to the touch sensor 102, but do not represent forces applied by a user to the touch sensor 102.

Examples of internal forces can include compression forces resulting from a glass screen pressing on the sensor when it is assembled, and any offset voltages associated with a device with which the touch sensor 102 is associated. Furthermore, the internal forces may be subject to variation over time, for example due to changes in temperature and environmental conditions. The internal forces may also drift with ageing.

The external forces may represent a user applying pressure to the touch sensor 102 with their finger or a stylus, for example, in order to select icons/functionality identified by buttons associated with the touch sensor 102.

As discussed above, the magnitude of internal forces may be greater than the magnitude of the external forces, for example the magnitude of internal forces may be of the order of 100 times greater than the magnitude of the external forces 100.

The configurable signal generator 104 is configured to generate a configurable control signal 110 and provide the configurable control signal 110 to the calibrator 106. The configurable signal generator 104 may be configured such that characteristics of the configurable control signal 110 are adjusted automatically in accordance with feedback. This is described in more detail below.

The calibrator 106 has at least one input configured to receive the non-calibrated touch input signal 108 and the configurable control signal 110. The calibrator 106 is configured to process the non-calibrated touch input signal 108 and the configurable control signal 110 to generate a calibrated signal 112 by removing the contribution of the internal forces from the non-calibrated touch input signal 108. This can be performed by applying the configurable control signal 110 to the non-calibrated signal 108.

Figure 2:
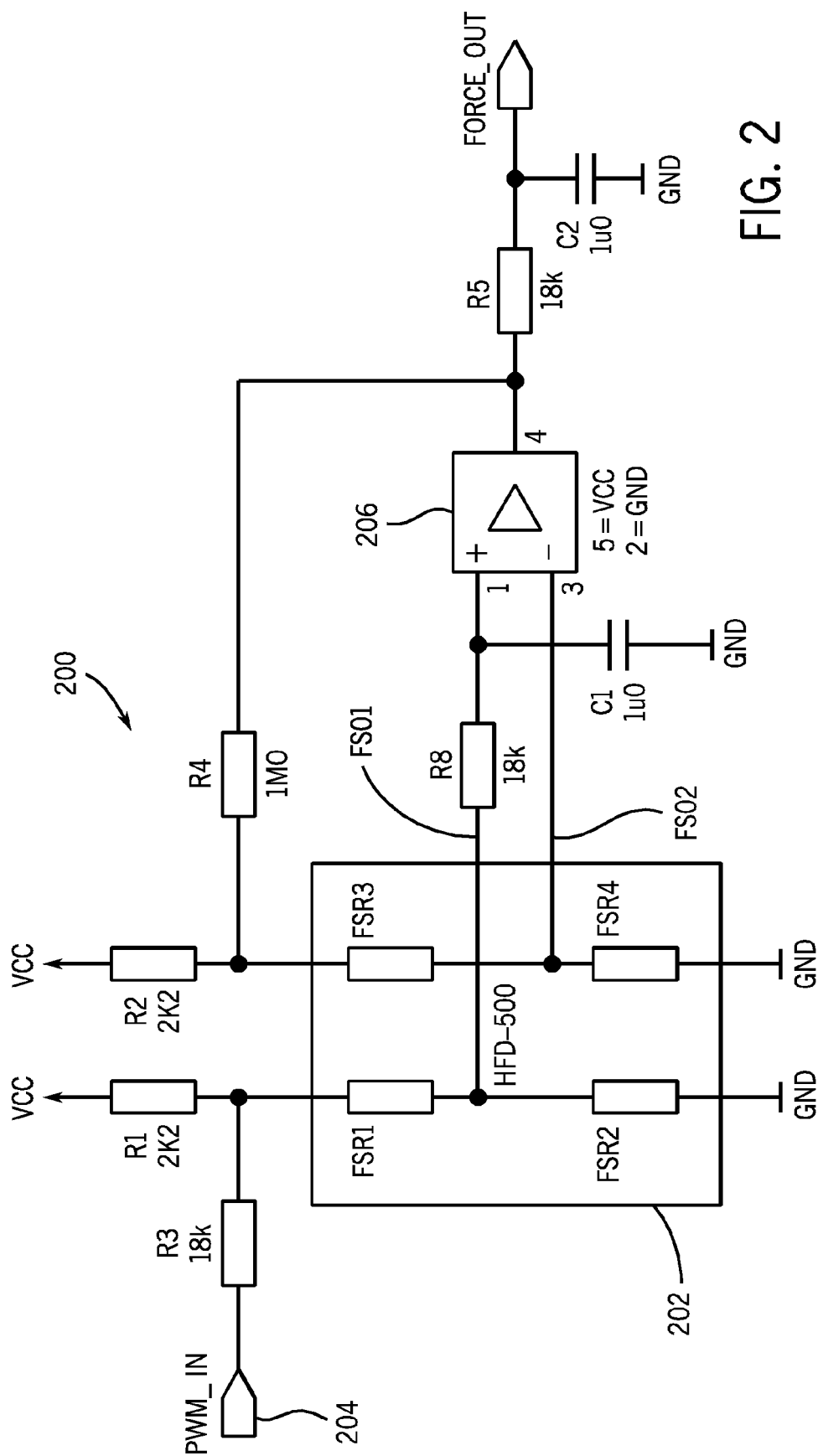
FIG. 2 illustrates a circuit diagram according to an embodiment of the invention.

FIG. 2 illustrates a further embodiment of apparatus for generating a calibrated signal according to another embodiment of the invention. In this embodiment, the apparatus is a circuit 200 comprising a force sensor 202 which is an embodiment of a touch sensor, a pulse-width-modulated (PWM) input signal 204 which is an embodiment of a configurable control signal generated by a configurable signal generator, and an operational amplifier 206 which is an embodiment of a calibrator.

Operation of the circuit diagram 200 illustrated in FIG. 2 will be described in combination with the signal timing diagrams illustrated in FIGS. 3A to 3H.

Figure 3A:
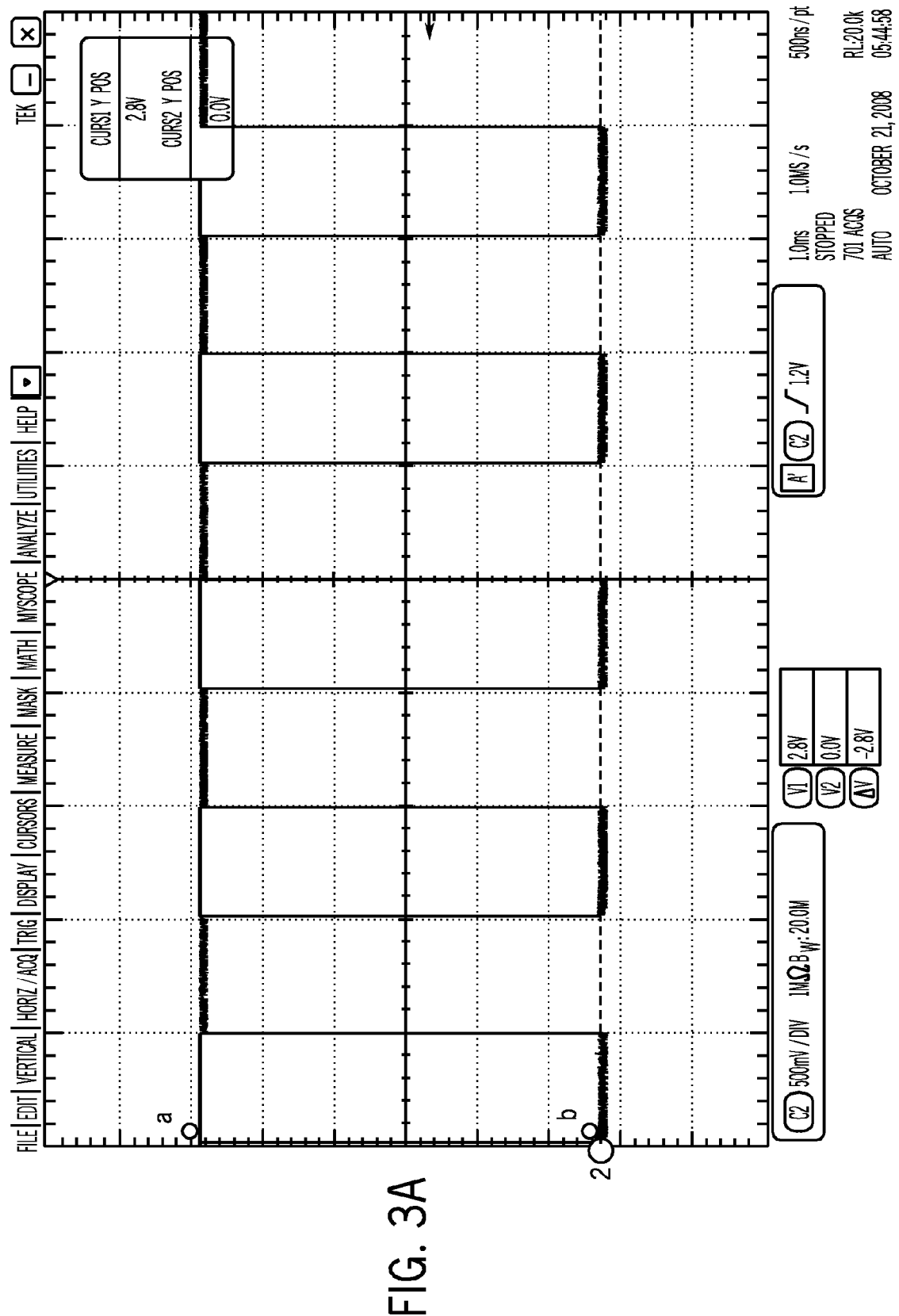
FIG. 3A-3H illustrates example timing diagrams of signals from the circuit diagram of FIG. 2.

An example pulse-width-modulated (PWM) input signal 204 is illustrated in FIG. 3A. It will be appreciated that a PWM signal is a square wave that has a controllable mark-space ratio in order to set a duty cycle of the waveform. It can be seen that the square wave illustrated in FIG. 3A has a 50% duty cycle, that is it is high for 50% of the time, and low for 50% of the time—the mark and space are equal.

Figure 3B:
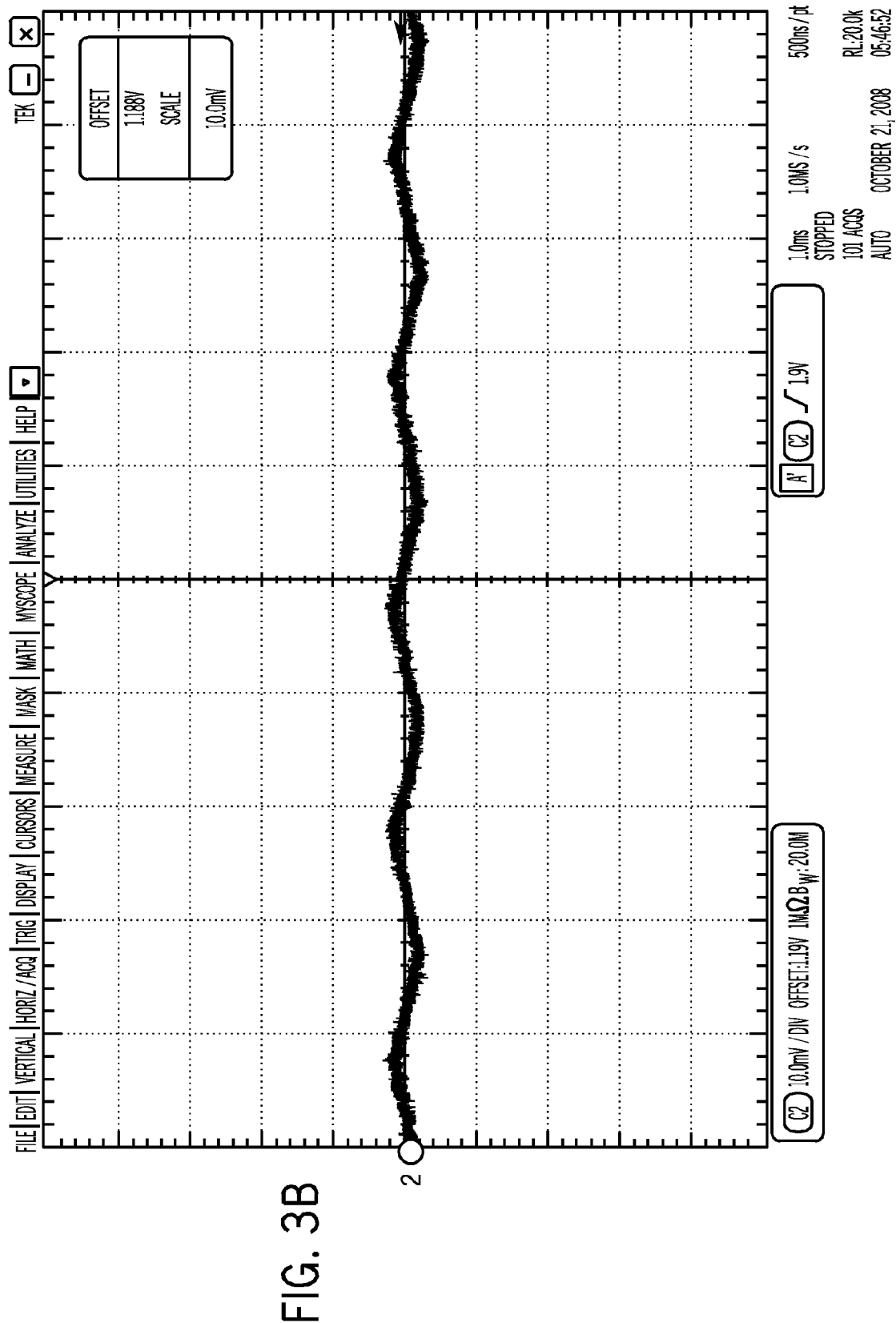

The PWM input signal 204 is integrated over time by the combination of resistors R3 and R6, the force sensor resistors FSR1 and FSR2, and capacitor C1 in order to provide a triangular waveform at the positive input of the operational amplifier 206. In addition to the triangular waveform component derived from the PWM input signal 204, the voltage at the positive input of the operational amplifier 206 also comprises a d.c. offset component that is provided by the force sensor 202, and more particularly, the resistor network FSR1 and FSR2 of the force sensor 202. An example of a signal at the positive input of the operational amplifier 206 is illustrated in FIG. 3B, and is an illustration of the voltage at the input when no external force is applied.

Resistor R6 is primarily responsible for controlling the gain of the operational amplifier 206, and the value of resistor R6 will have an impact on the PWM step resolution. The resistance value of R6 is chosen so as to trade-off between the required gain and the available step change of the PWM signal.

Figure 3C:
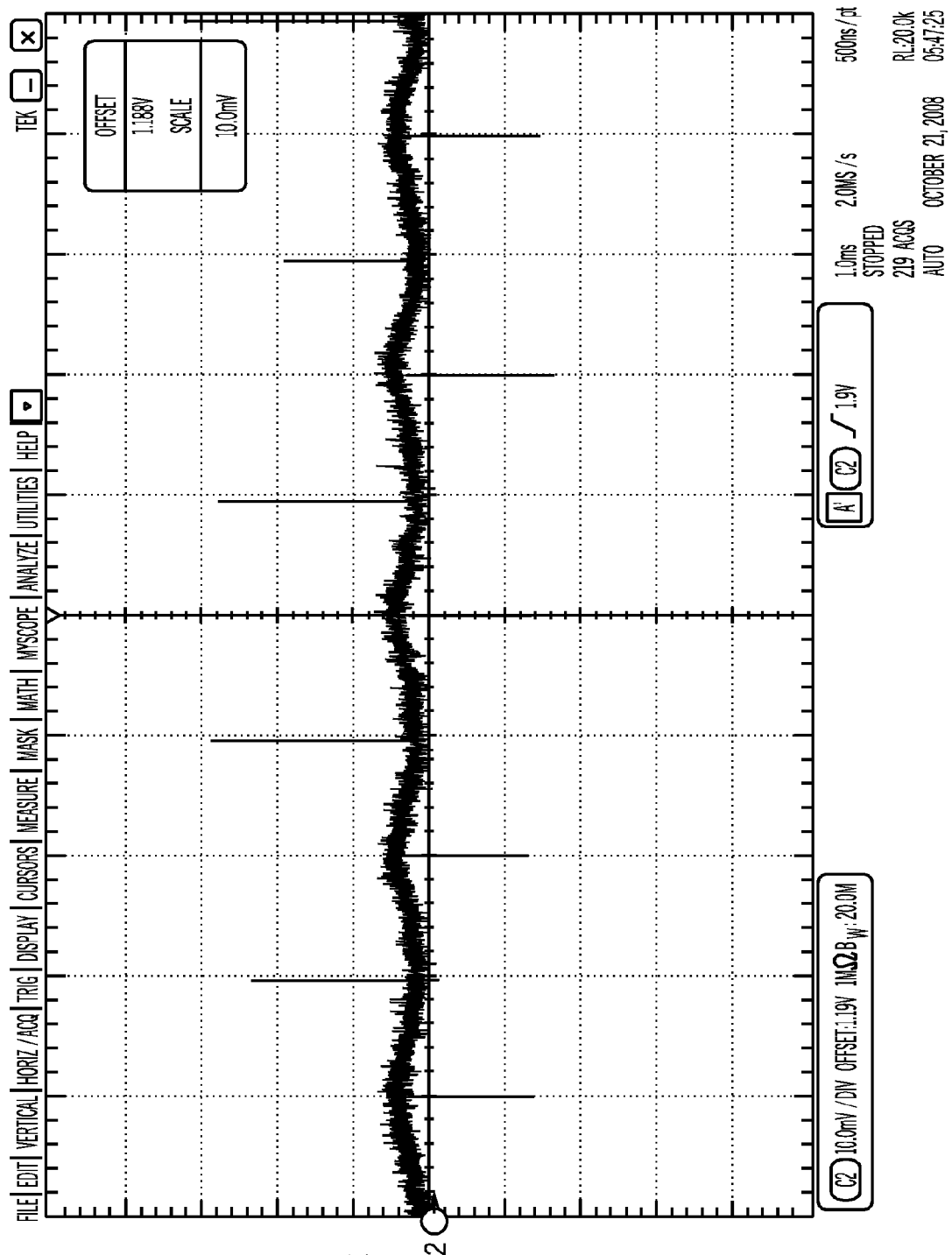

FIG. 3C shows an example of a signal at the negative input of the operational amplifier 206 when no external force is applied. In this example, due to the negative feedback configuration of the operational amplifier 206, the operational amplifier 206 will try to make the output voltage whatever is necessary to make the input voltages as nearly equal as possible. This explains why the waveform at the negative input of the operational amplifier 206 is also generally a triangular waveform.

Figure 3D:
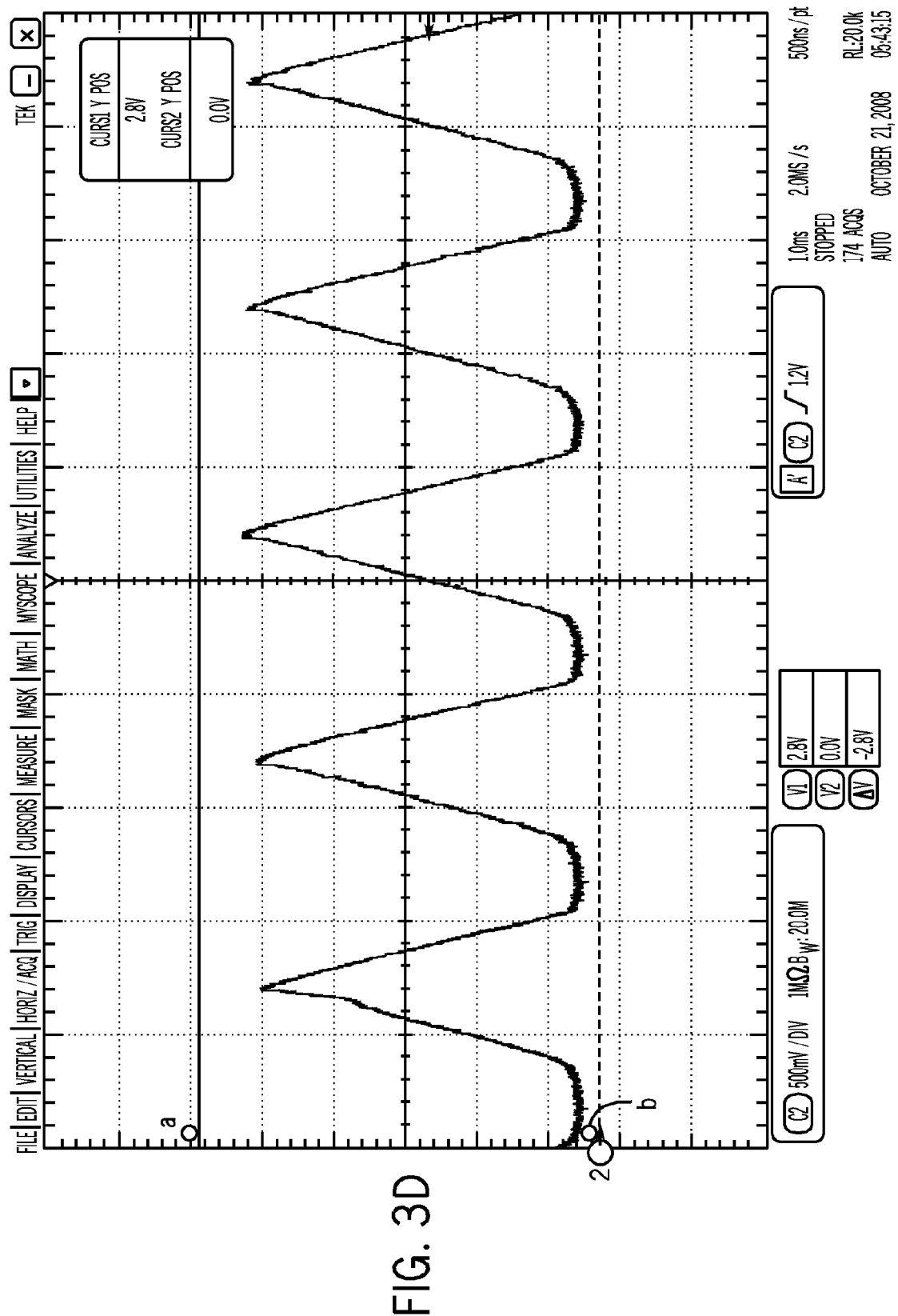

FIG. 3D shows an example of the operational amplifier 206 output signal when no external force is applied. It can be seen that the operational amplifier 206 output signal is a generally triangular waveform, wherein for the majority of the time the voltage is less than zero, that is, the time averaged value of the output signal is less than zero.

It will be appreciated, that by varying the duty cycle of the PWM input signal 204, the operational amplifier 206 positive input signal (FIG. 3B) will have a higher time averaged value, which in turn will lead to the operational amplifier 206 output signal also having a higher time averaged average value, that is the operational amplifier 206 output signal will be high for longer than the example illustrated in FIG. 3D.

The output of the operational 206 amplifier when no external force is applied to the force sensor 202 represents the contribution of the internal forces that are applied to the force sensor 202. As discussed above, the internal forces may include the weight of the glass/screen on the force sensor 202, and may vary with time.

Figure 3E:
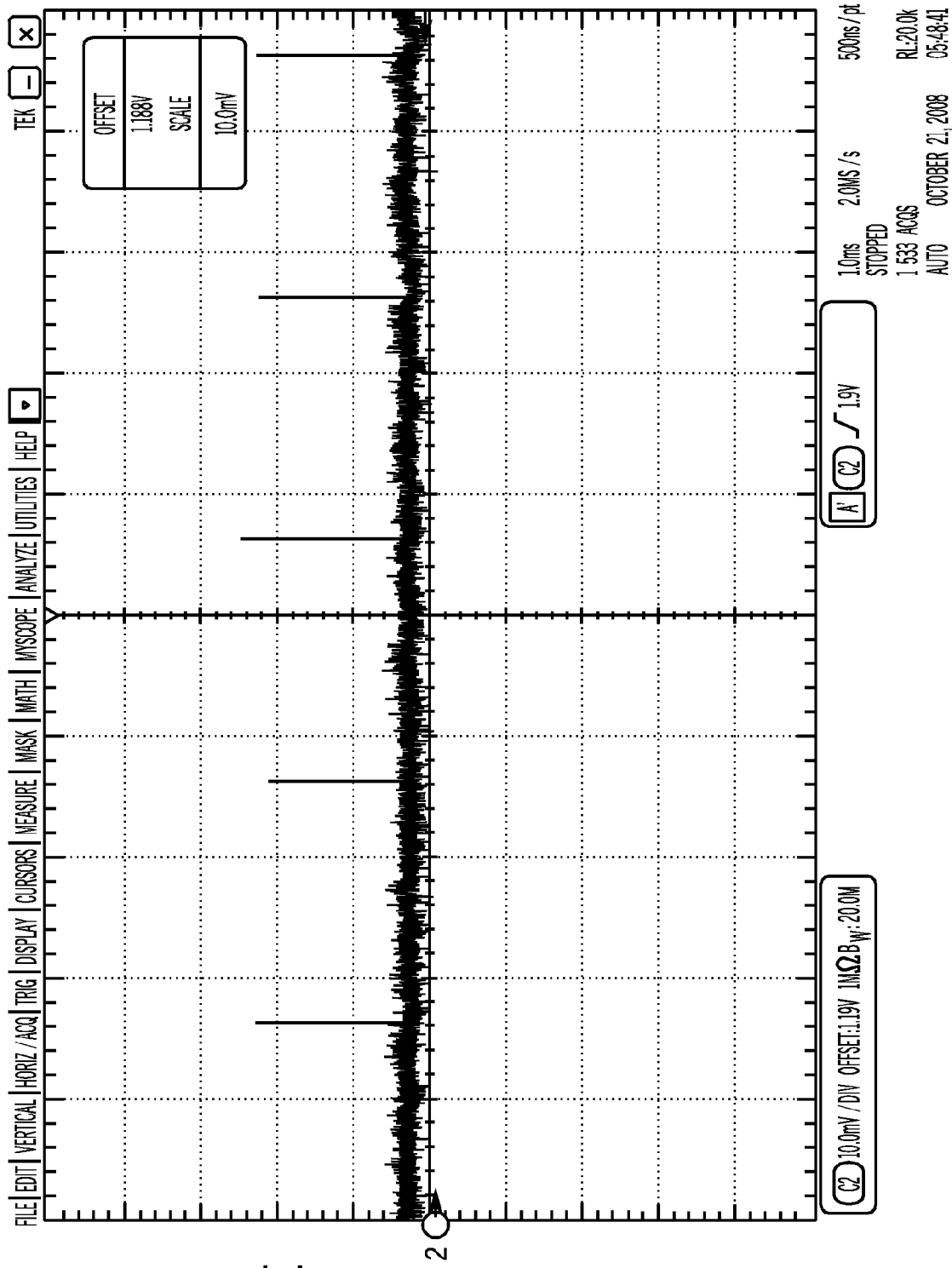
Figure 3F:
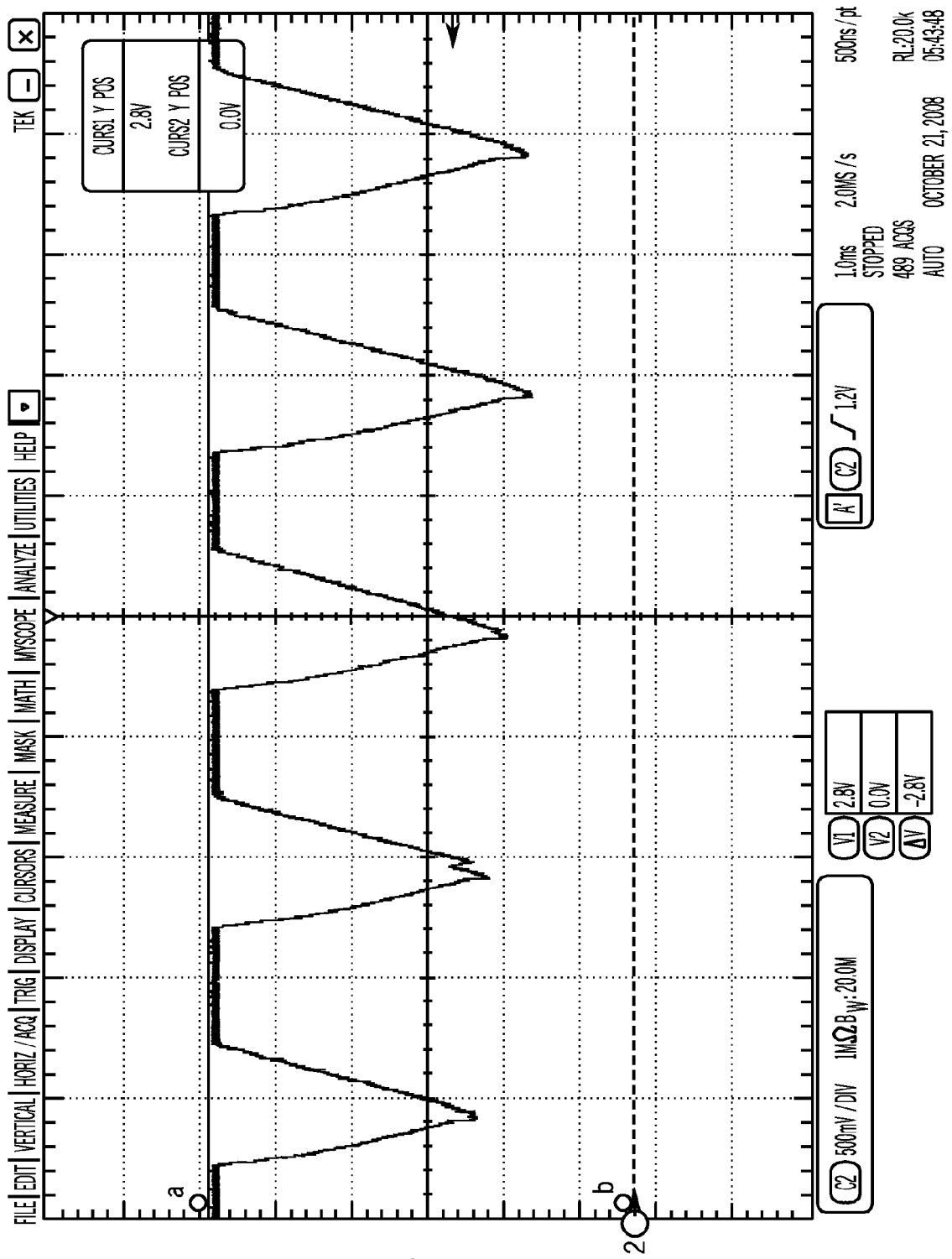

When an external force is applied to the force sensor 202, the voltages between the two force sensor outputs FSO1 and FSO2 changes. In this embodiment, each resistive element FSR1, FSR2, FSR3, FSR4 of the force sensor 202 changes it's resistance when an external force is applied, and the resistors FSR1, FSR2, FSR3, FSR4 (known collectively as the bridge) have been configured so that, when an external force is applied, the output on FSO1 increases to the same extent as the output on FSO2 decreases. An example of the voltage at the FSO2 output is shown in FIG. 3E. The FSO2 output signal is the same as the operational amplifier 206 negative input signal. It can be seen that the operational amplifier 206 negative input signal is flatter when an external force is applied when compared to the input signal when no force is applied, as shown in FIG. 3C.

The overall decrease in the time averaged voltage at the operational amplifier 206 negative input when an external force is applied to the force sensor 202 causes a greater time averaged difference between the voltages at the input of the operational amplifier 206 and therefore increases the time averaged voltage at the output of the operational amplifier 206. An example of a signal at the output of the operational amplifier 206 when an external force is applied is shown as FIG. 3F. In contrast to the operational amplifier 206 output signal when no external force is applied (FIG. 3D), the voltage is greater than zero for more time than it is less than zero.

Figure 3G:
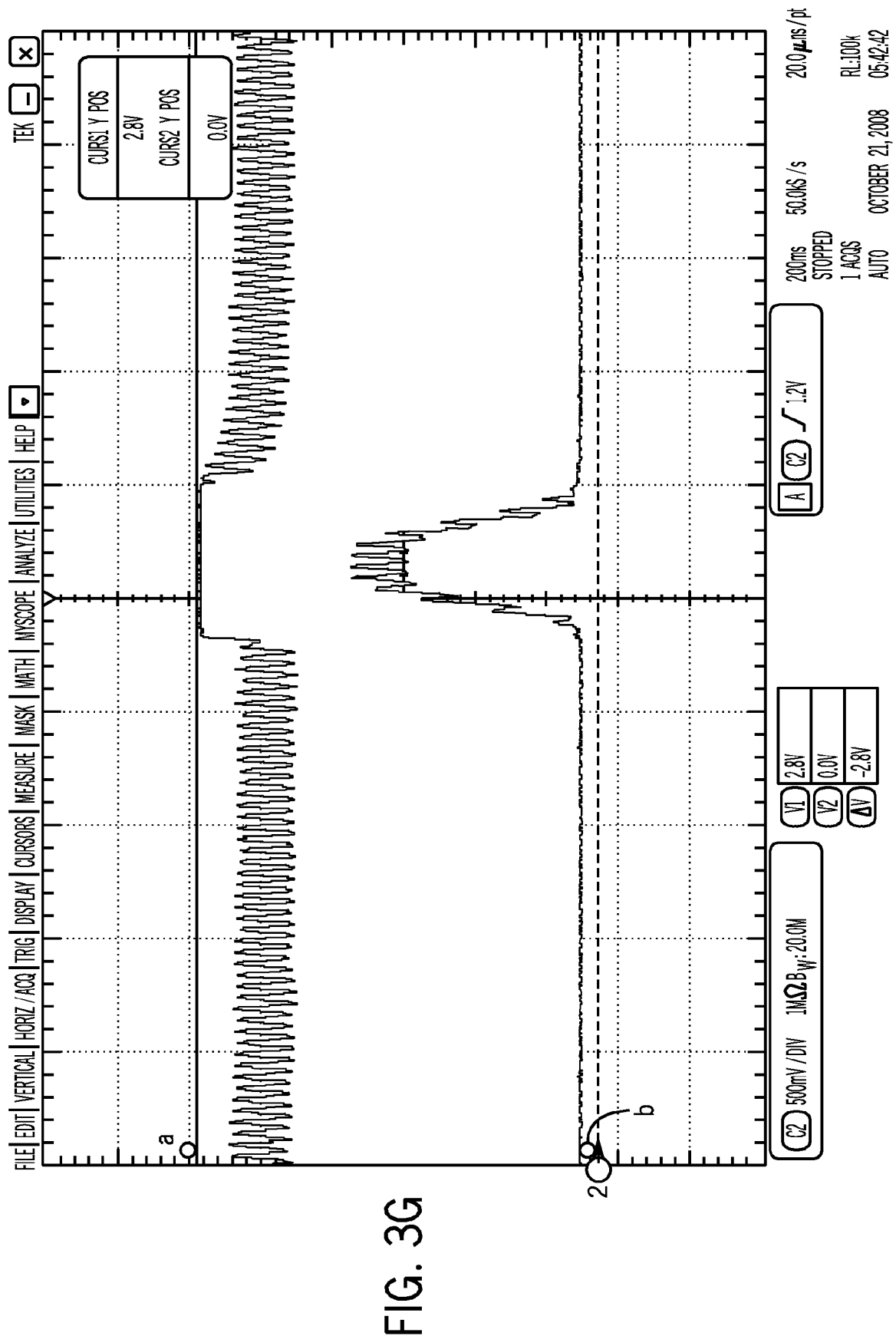
Figure 3H:
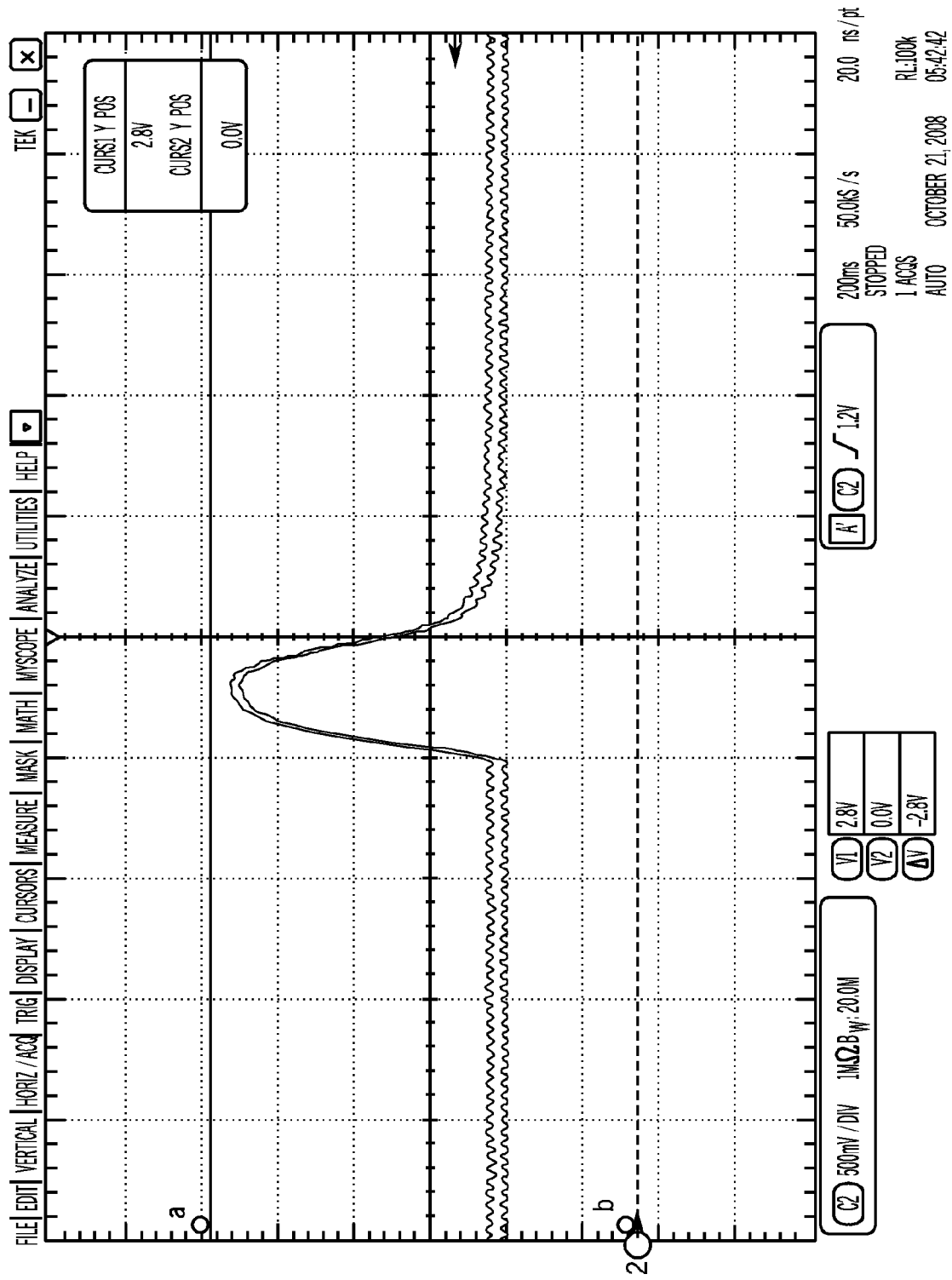

FIG. 3G shows an example of the operational amplifier 206 output signal over a period of time when no external force is applied for the period of time 302 represented by the start and the end of the signal, and an external force is applied for the period of time 304 represented by the middle section of the signal.

The operational amplifier 206 output signal is integrated over time by resistor R5 and capacitor C2 in order to provide an integrated output signal (FORCE_Out) which represents an external force that has been applied to the force sensor 202. The FORCE_Out signal is an embodiment of a calibration signal.

In summary, the circuit 200 uses a single operational amplifier 206 (or comparator) with the inputs of the operational amplifier 206 fed from the force sensor bridge outputs FSO1, FSO2. One of the operational amplifier inputs is combined with a PWM signal which is integrated over time to give a triangular waveform. The PWM signal may be derived from a configurable signal generator that is present on a microprocessor, which may or may not be local to the circuit 200. The integrated PWM signal is used to control a bias applied to the operational amplifier 206 so that by varying the modulation width of the PWM signal, the d.c. offset component of the force sensor circuit representing internal forces can be cancelled out. The output of the operational amplifier 206 is a pulsed signal with the width of the pulses determined by the point where the force sensor output signal which is provided as an input to the operational amplifier 206 crosses the threshold of the triangular wave input. The operational amplifier 206 output signal is then integrated over time and used as an calibration signal output with the d.c. level proportional to the external force applied.

The circuit 200 of FIG. 2 may be operated in at least two ways. In a first method of operation, a periodic calibration of the duty cycle (mark-space-ratio) of the PWM signal is carried out when it is known, or assumed, that no external forces are being applied to the force sensor 202. In this example, the duty cycle of the PWM signal is adjusted until the output signal of the circuit (FORCE_Out) is within predetermined limits, for example it meets a threshold voltage. Example threshold voltages may be in the range of 0.9 and 1.1 volts, and this output threshold voltage is considered representative of the internal forces that are applied to the force sensor 202. The applied external force can then be determined by detecting any d.c. voltage variations from the threshold voltage at the output calibration signal (FORCE_Out) of the circuit 200 as external forces are applied to the force sensor 202.

An alternative method for operating the circuit 200 of FIG. 2, is to continually adjust the duty cycle (mark-space-ratio) of the PWM signal so that the voltage at the output calibration signal (FORCE_Out) of the circuit stays at a fixed threshold level. In this example, the external force can be determined as being proportional to the changes that are required to the duty cycle of the PWM signal in order to maintain a constant voltage of the output calibration signal (FORCE_Out).

It will be appreciated that the operational amplifier 206 does not need to be operated in a negative feedback mode to work the invention. In some embodiments, the operational amplifier may be configured in an open-loop mode as a comparator, although in some examples providing negative feedback can improve the stability of the circuit 200. In embodiments that use the operational amplifier 206 in open-loop mode, the gain may have to be carefully controlled.

It will also be appreciated that a PWM signal is just one embodiment of a configurable control signal that can be used. In the embodiment of FIG. 2, a PWM signal is convenient because it is locally available on a microprocessor that is present on the same device as the circuit 200. In other embodiments however, any configurable signal can be used. For example a configurable d.c. control signal could be used, such as through use of a variable resistor, or any configurable a.c./oscillating control signal could be used.

Figure 4:
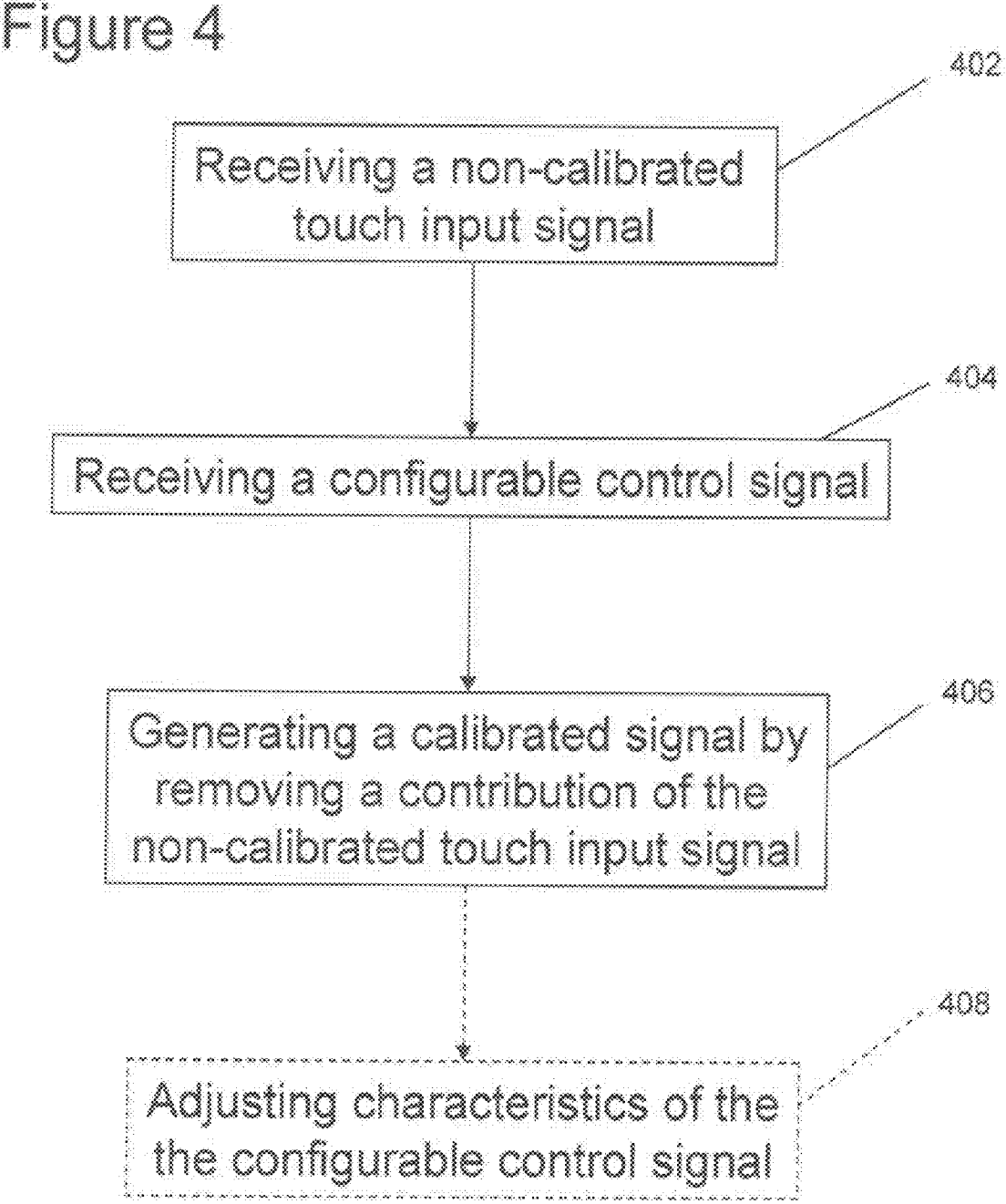
FIG. 4 illustrates schematically a method according to an embodiment of the invention.

FIG. 4 illustrates an example of a method for generating a calibrated signal according to an embodiment of the invention, and optionally for calibrating the apparatus through performance of optional step 408.

At step 402 a non-calibrated touch input signal is received, and at step 404, a configurable control signal is received. It will be appreciated that the order of steps 402 and 404 does not affect the operation of the invention. The non-calibrated touch input signal is representative of both internal and external forces that have been applied to a touch sensor, and the characteristics of the configurable control signal has been configured such that it is suitable for removing the contribution of the internal forces from the non-calibrated touch input signal.

The control signal may be an oscillating signal or a d.c. signal. In embodiments where the control signal is an oscillating signal, the characteristics of the configurable control signal that can be adjusted can include one or more of: mark-space ratio, frequency and amplitude.

At step 406, a calibrated signal is generated by applying the configurable control signal to the non-calibrated touch input signal to remove the contribution of the internal forces from the non-calibrated touch input signal. Applying the configurable control signal may comprise subtracting it from the non-calibrated touch input signal.

Optionally, a further step 408 can be performed for calibrating the apparatus. At step 408, one or more characteristics of the configurable control signal are adjusted until the calibrated signal satisfies a threshold condition. The threshold condition may be that the amplitude of a calibrated signal is within a predefined range of voltages.

If the calibrated signal does not satisfy the threshold condition, then the characteristics of the configurable control signal, for example the mark-space-ratio of a pulse width modulated (PWM) signal is increased or decreased in order to change the time averaged amplitude of the calibrated signal until it satisfies the threshold condition.

In some embodiments, the calibration method illustrated by steps 402 to 408 can be performed each time a device comprising the apparatus is switched on. Alternatively, or additionally, the calibration method may also be performed periodically over time, for example every 24 hours, or may be performed upon determination of a predefined event. An example of a predefined event is that, during operation, the calibrated signal value falls below the threshold condition. This may provide an indication that the device was inadvertently calibrated when an external force was being applied, and that it should be recalibrated.

In other embodiments, a calibration method according to embodiments described herein may be performed when a device comprising a force sensor is in communication with another device—for example, each time a PDA/mobile telephone is connected to a docking station. In such embodiments, some of the processing and/or components of embodiments described herein may be located in the other device and not in the apparatus in which the force sensor is located. For example, a configurable signal generator and/or components that are used to control characteristics of the configurable control signal may be located in the other device/docking station. It will be appreciated that some or all of the functionality described herein may be distributed over a plurality of devices.

The method of FIG. 4 and/or any of the other methods/processes described herein may be performed by computer software.

It will be appreciated to the skilled reader that the apparatus/device/server and/or other features of particular apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor and/or on one or more memories/processors.

It will be appreciated that the aforementioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

With reference to any discussion of processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. Apparatus comprising:
one or more inputs configured to receive:
a configurable control signal from a configurable signal generator; and a non-calibrated touch input signal from a touch sensor, said non-calibrated touch input signal generated by detecting internal forces or both the internal forces and an external force applied to the touch sensor; and a calibrator configured to process the non-calibrated touch input signal and the configurable control signal to remove the contribution of the internal forces from the non-calibrated signal to generate a calibrated signal, the calibrated signal for use in the detection of the external force applied to the touch sensor, wherein the internal forces exist in the touch sensor before applying the external force, and the calibrator is configured to remove the contribution of the internal forces from the non-calibrated signal using the configurable control signal when the external force is applied or not applied to the touch sensor.

2. The apparatus of claim 1, wherein the configurable control signal is an oscillating signal.

3. The apparatus of claim 1, wherein characteristics of the configurable control signal are set such that the calibrated signal meets a threshold condition when no external force.

4. The apparatus of claim 3, wherein the characteristics can comprise one or more of: mark-space ratio, frequency and amplitude.

5. The apparatus of claim 1, wherein the configurable control signal is a triangular waveform that has been generated by integrating a pulse width modulated signal over time.

6. The apparatus of claim 1, wherein the calibrated signal is integrated over time to generate an integrated output signal.

7. The apparatus of claim 1, wherein the calibrator comprises an operational amplifier.

8. The apparatus of claim 7, wherein the negative input of the operational amplifier is controlled by negative feedback from the output of the operational amplifier.

9. The apparatus of claim 1, wherein the calibrator comprises a comparator.

10. The apparatus of claim 1, wherein characteristics of the configurable control signal are set at times when it is assumed that no external force is being applied to the touch sensor such that the calibrated signal satisfies a threshold condition when no external force is applied, and wherein characteristics of the calibrated signal is representative of an external force applied to the touch sensor.

11. The apparatus of claim 1, wherein the characteristics of the configurable control signal are set periodically such that the calibrated signal tends towards a threshold condition, and wherein the characteristics of the configurable control signal are representative of an external force applied to the touch sensor.

12. A capacitive touch screen comprising the apparatus of claim 1.

13. A portable electronic device comprising the apparatus according to claim 1.

14. A module for a device, the module comprising the apparatus of claim 1.

15. The apparatus of claim 1, wherein said contribution of the internal forces is a DC offset.

16. A method of generating a calibrated signal for use in the detection of an external force applied to a touch sensor, comprising:

receiving a non-calibrated touch input signal representative of internal forces or both the internal forces and the external force applied to the touch sensor;

receiving a configurable control signal from a configurable signal generator; and processing the non-calibrated touch input signal and the configurable control signal to remove the contribution of the internal forces from the non-calibrated signal to generate a calibrated signal, the calibrated signal for use in the detection of the external force applied to the touch sensor, wherein the internal forces exist in the touch sensor before applying the external force, and during said processing the contribution of the internal forces is removed from the non-calibrated touch input signal using the configurable control signal when the external force is applied or not applied to the touch sensor.

17. A method of calibrating an apparatus comprising the method of claim 16, and further comprising adjusting one or more characteristics of the configurable control signal until the calibrated signal satisfies a threshold condition.

18. A method of calibrating an apparatus comprising performing the method of claim 16 if the calibrated signal falls below a pre-determined threshold condition.

19. The method of claim 16, wherein said contribution of the internal forces is a DC offset.

20. A computer program, recorded on a carrier, the computer program comprising computer code, which when run on a computer is configured to perform the method of:

receiving a non-calibrated touch input signal representative of internal forces or both the internal forces and an external force applied to the touch sensor applied to the touch sensor;

receiving a configurable control signal from a configurable signal generator; and processing the non-calibrated touch input signal and the configurable control signal to remove the contribution of the internal forces from the non-calibrated signal to generate a calibrated signal, the calibrated signal for use in the detection of the external force applied to the touch sensor, wherein the internal forces exist in the touch sensor before applying the external force, and during said processing the contribution of the internal forces is removed from the non-calibrated touch input signal using the configurable control signal when the external force is applied or not applied to the touch sensor.

21. A computer-readable storage medium having stored thereon a data structure comprising the computer program of claim 20.

22. A signal comprising the computer program of claim 20 recorded thereon.

23. The computer program of claim 20, wherein said contribution of the internal forces is a DC offset.

24. Apparatus comprising:

one or more input means configured to receive:

a configurable control signal from a means for generating a configurable signal; and a non-calibrated touch input signal from a means for touch sensing, said non-calibrated touch input signal generated by detecting internal forces or both the internal forces and an external force applied to the touch sensor applied to the means for touch sensing; and a means for calibrating configured to process the non-calibrated touch input signal and the configurable control signal to remove the contribution of the internal forces from the non-calibrated signal to generate a calibrated signal, the calibrated signal for use in the detection of the external force applied to the means for touch sensing, wherein the internal forces exist in the touch sensor before applying the external force, and the means for calibrating is configured to remove the contribution of the internal forces from the non-calibrated signal using the configurable control signal when the external force is applied or not applied to the touch sensor.

* * * * *